United States Patent
Omori (10) Patent No.: US 10,306,153 B2
(45) Date of Patent: May 28, 2019

(54) IMAGING APPARATUS, IMAGE SENSOR, AND IMAGE PROCESSOR

(71) Applicant: Sony Corporation, Tokyo (JP)

(72) Inventor: Shiro Omori, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/746,620

(22) PCT Filed: Jul. 15, 2016

(86) PCT No.: PCT/JP2016/071057
§ 371 (c)(1),
(2) Date: Jan. 22, 2018

(87) PCT Pub. No.: WO2017/018260
PCT Pub. Date: Feb. 2, 2017

(65) Prior Publication Data
US 2018/0220055 A1    Aug. 2, 2018

(30) Foreign Application Priority Data

Jul. 30, 2015  (JP) .................................. 2015-150805

(51) Int. Cl.
*H04N 5/235* (2006.01)
*H04N 5/232* (2006.01)
(Continued)

(52) U.S. Cl.
CPC ......... *H04N 5/2355* (2013.01); *G06K 9/4642* (2013.01); *G06K 9/78* (2013.01);
(Continued)

(58) Field of Classification Search
CPC ............... H04N 5/2355; H04N 5/2351; H04N 5/23219; G06T 7/11; G06F 17/30247; G06K 9/78
See application file for complete search history.

(56) References Cited

U.S. PATENT DOCUMENTS

2003/0215115 A1* 11/2003 Kim .................. G06K 9/00275
382/118
2007/0195183 A1* 8/2007 Ovsiannikov ...... H04N 5/35509
348/308

FOREIGN PATENT DOCUMENTS

JP  2007-065048 A  3/2007
JP  2007-171807 A  7/2007
(Continued)

OTHER PUBLICATIONS

International Search Report and Written Opinion and English translation thereof dated Sep. 27, 2016 in connection with International Application No. PCT/JP2016/071057.
(Continued)

*Primary Examiner* — Ahmed A Berhan
(74) *Attorney, Agent, or Firm* — Wolf, Greenfield & Sacks, P.C.

(57) ABSTRACT

The present disclosure relates to an imaging apparatus, an image sensor, and an image processor capable of reducing a load on an image processing unit related to image recognition processing.

An imaging apparatus according to a first aspect of the present disclosure includes: an image sensor adapted to output image data including pixel signals generated in accordance with incident light by photoelectric conversion elements vertically and horizontally arranged on an imaging surface, adapted to divide the imaging surface into a plurality of areas, and adapted to generate image recognition support information for each of the areas on the basis of the pixel signals generated by the photoelectric conversion elements belonging to the area; and an image processing unit adapted to apply predetermined image processing to the image data output from image sensor by using the image processing support information output from the image sen-
(Continued)

sor. The present disclosure is applicable to, for example, a camera having a face detection function.

11 Claims, 7 Drawing Sheets (51) Int. Cl.
G06K 9/78 (2006.01)
G06K 9/46 (2006.01)
H04N 9/64 (2006.01)
H04N 5/30 (2006.01)
G06K 9/00 (2006.01)
G06T 7/80 (2017.01)
G06T 7/11 (2017.01)
H04N 9/73 (2006.01)

(52) U.S. Cl.
CPC ............... *G06T 7/11* (2017.01); *G06T 7/80* (2017.01); *H04N 5/2351* (2013.01); *H04N 5/23219* (2013.01); *H04N 5/30* (2013.01); *H04N 9/643* (2013.01); *H04N 9/73* (2013.01); *G06K 9/00255* (2013.01); *G06K 9/00261* (2013.01)

(56) References Cited

FOREIGN PATENT DOCUMENTS

| | | |
|---|---|---|
| JP | 2009-271557 A | 11/2009 |
| JP | 2013-148915 A | 8/2013 |
| JP | 2015-023332 A | 2/2015 |

OTHER PUBLICATIONS

International Preliminary Report on Patentability and English translation thereof dated Feb. 8, 2018 in connection with International Application No. PCT/JP2016/071057.

* cited by examiner

IMAGING APPARATUS, IMAGE SENSOR, AND IMAGE PROCESSOR

CROSS-REFERENCE TO RELATED APPLICATIONS

This application is a National Stage of International Application No. PCT/JP2016/071057, filed in the Japanese Patent Office as a Receiving office on Jul. 15, 2016, which claims priority to Japanese Patent Application Number 2015-150805, filed in the Japanese Patent Office on Jul. 30, 2015, each of which is hereby incorporated by reference in its entirety.

TECHNICAL FIELD

The present disclosure relates to an imaging apparatus, an image sensor, and an image processor, and particularly, relates to an imaging apparatus, an image sensor, and an image processor suitable to be used in a case of detecting a face or the like on an image.

BACKGROUND ART

In the related art, proposed is an imaging apparatus such as a digital camera or a digital video camera in which a person's face or hand is detected from an image, the detected face is tracked and focused or predetermined processing is executed in accordance with movement of the detected hand (refer to Patent Document 1, for example).

Such an imaging apparatus includes: an image sensor to image a moving image and output image data; and an image processing unit to apply image recognition processing to the image data from the image sensor. This image processing unit is implemented by hardware including an image signal processor (DSP) and the like, or by a computer executing software.

Generally, in the image recognition processing, a recognition object (human face, hand, or the like) is detected while an entire image output from the image sensor is set as a search range.

Furthermore, in the image recognition processing, in a case of detecting a recognition object on a certain frame on the grounds that the recognition object on a screen is rapidly moved to a distant place, detection for the recognition object is attempted again in next and subsequent frames thereto while only a periphery of a position where the recognition object has been detected in a previous frame is set as the search range of the recognition object. Consequently, the recognition object once detected can be continuously tracked.

Additionally, in the image recognition processing, the entire image is periodically set as the search range so as to be able to detect a fact that a recognition object other than the recognition object already detected enters the screen.

CITATION LIST

Patent Document

Patent Document 1: Japanese Patent Application Laid-Open No. 2013-148915

SUMMARY OF THE INVENTION

Problems to be Solved by the Invention

As described above, in an imaging apparatus that performs image recognition processing, an image sensor only outputs captured image data to an image processing unit in a subsequent stage, and the image processing unit takes a role to perform the image recognition processing. Therefore, the image processing unit takes a heavy load related to the image recognition processing than the image sensor does, and this brings about factors of power consumption increase, for example, a circuit size is enlarged and high speed operation is demanded.

The present disclosure is has been made in view of the above-described situation and is directed to achieving reduction of a load on the image processing unit related to the image recognition processing by outputting, from an image sensor, not only image data but also image recognition support information useful for the image recognition processing.

Solutions to Problems

An imaging apparatus according to a first aspect of the present disclosure includes: an image sensor adapted to output image data including pixel signals generated in accordance with incident light by photoelectric conversion elements vertically and horizontally arranged on an imaging surface, adapted to divide the imaging surface into a plurality of areas, and adapted to generate image recognition support information for each of the areas on the basis of the pixel signals generated by the photoelectric conversion elements belonging to the area; and an image processing unit adapted to apply predetermined image processing to the image data output from image sensor by using the image processing support information output from the image sensor.

The image sensor can set a threshold value for the image processing support information for each of the areas, and in a case where the calculated image processing support information exceeds the threshold value, the image sensor can flag and output the calculated image processing support information.

The image sensor performs, for each of the areas, statistical operation on the pixel signals generated by the photoelectric conversion elements belonging to the area, and can calculate the image processing support information.

The image sensor can calculate, for each of the areas, divided illuminance data as the image processing support information by weighting and averaging the pixel signals generated by the photoelectric conversion elements belonging to the area.

The image sensor can output at least one of a temperature, a distance, a phase difference, and a hue in each of the areas as the image processing support information.

The image sensor can set the threshold value on the basis of the image processing support information calculated for each of the areas.

The image processing unit can limit a target region of the predetermined image processing in accordance with presence of a flag in the image processing support information of each of the areas.

The image processing unit can set, as a target of the predetermined image processing, the area corresponding to the flagged image processing support information out of the image data output from the image sensor.

The image processing unit performs image recognition processing as the predetermined image processing, and can set, as a search region of the image recognition processing, a near field region including a region having a recognition object detected by the image recognition processing applied to the image data of a previous frame, out of the image data output from image sensor.

The image sensor can output the image data and the image processing support information of each of the areas respectively from different I/Fs.

According to the first aspect of the present disclosure, the image sensor is adapted to output the image data including the pixel signals generated in accordance with incident light by the photoelectric conversion elements vertically and horizontally arranged on the imaging surface, adapted divide the imaging surface into the plurality of areas, and adapted calculate and output the image recognition support information for each of the areas on the basis of the pixel signals generated by the photoelectric conversion elements belonging to the area, and the image processing unit is adapted to apply the predetermined image processing to the image data output from the image sensor by using the image processing support information output from the image sensor.

An image sensor according to a second aspect of the present disclosure outputs image data including pixel signals generated in accordance with incident light by photoelectric conversion elements vertically and horizontally arranged on an imaging surface, divides the imaging surface into a plurality of areas, and generates image recognition support information for each of the areas on the basis of the pixel signals generated by the photoelectric conversion elements belonging to the area.

According to the second aspect of the present disclosure, the image data including the pixel signals generated in accordance with incident light by the photoelectric conversion elements vertically and horizontally arranged on the imaging surface are output, the imaging surface is divided into the plurality of areas, and the image recognition support information is calculated and output for each of the areas on the basis of the pixel signals generated by the photoelectric conversion elements belonging to the area.

An image processor according to a third aspect of the present disclosure applies predetermined image processing to image data output from an image sensor by using image processing support information output from the image sensor, in which the image sensor outputs the image data including pixel signals generated in accordance with incident light by photoelectric conversion elements vertically and horizontally arranged on an imaging surface, divides the imaging surface into a plurality of areas, and generates the image recognition support information for each of the areas on the basis of the pixel signals generated by the photoelectric conversion elements belonging to the area.

According to the third aspect of the present disclosure, the predetermined image processing is applied to image data output from the image sensor by using the image processing support information output from the image sensor.

Effects of the Invention

According to the first aspect of the present disclosure, the load on the image processing unit can be reduced.

According to the second aspect of the present disclosure, the image processing support information useful for the predetermined image processing such as the image recognition processing can be output.

According to the third aspect of the present disclosure, the predetermined image processing can be efficiently performed on the basis of the image processing support information from the image sensor.

MODE FOR CARRYING OUT THE INVENTION

In the following, a best mode (hereinafter referred to as embodiment) to implement the present disclosure will be described in detail with reference to the drawings.

<Exemplary Configuration of Imaging Apparatus as Embodiment of Present Disclosure>

Figure 1:
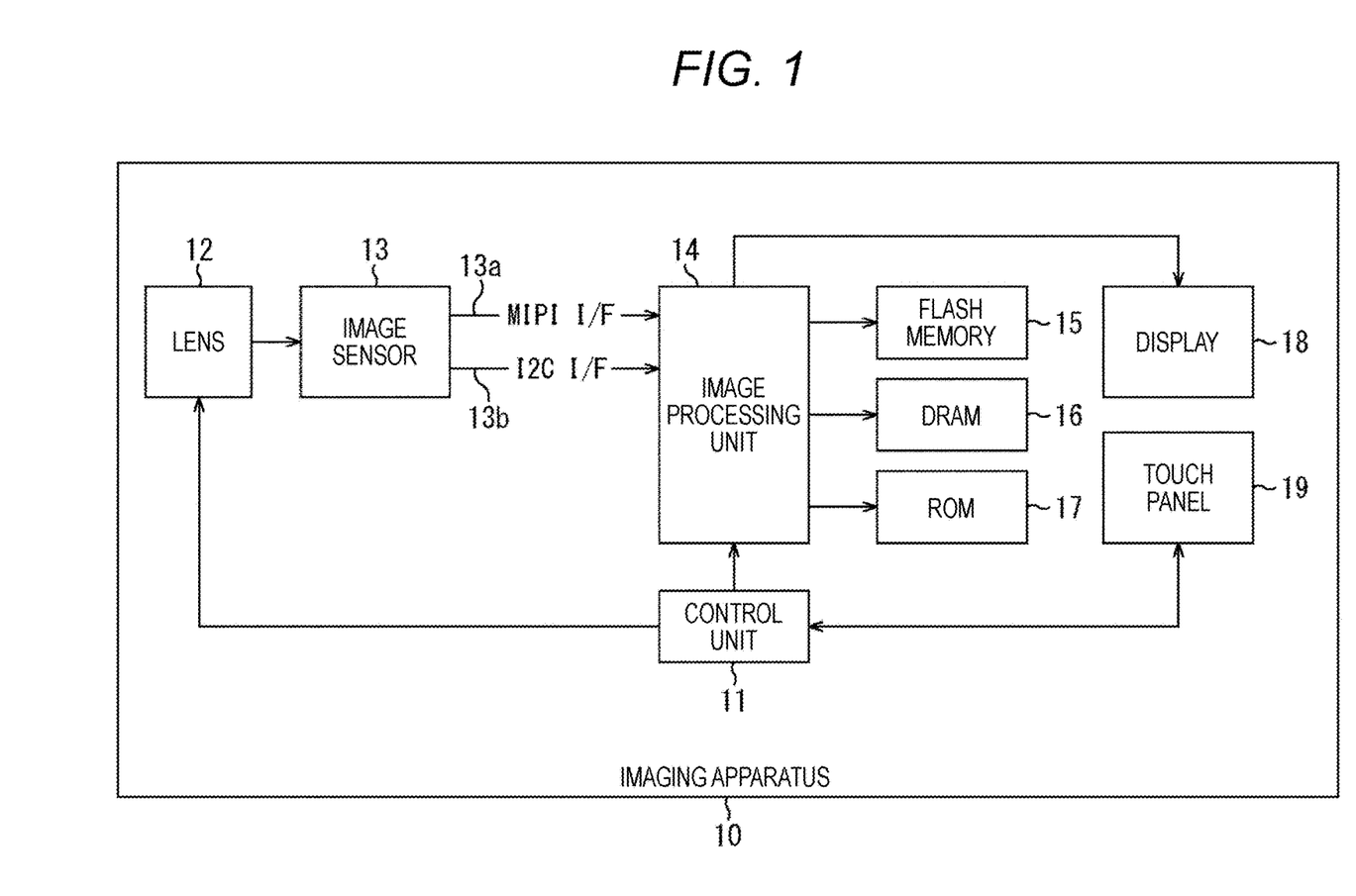
FIG. 1 is a block diagram illustrating an exemplary configuration of an imaging apparatus to which the present disclosure is applied.

FIG. 1 illustrates an exemplary configuration of an imaging apparatus as an embodiment of the present disclosure. An imaging apparatus 10 includes a control unit 11, a lens 12, an image sensor 13, an image processing unit 14, a flash memory 15, a DRAM 16, a ROM 17, a display 18, and a touch panel 19.

The control unit 11 controls the entire imaging apparatus 10. The lens 12 allows incidence of an optical image of a subject to the image sensor 13.

The image sensor 13 has a large number of photoelectric conversion elements vertically and horizontally arranged on an imaging surface thereof, performs photoelectric conversion processing in accordance with incident light, and outputs image data (RAW data) in a frame unit obtained as a result thereof to the image processing unit 14 via an MIPI I/F 13a.

Additionally, the image sensor 13 calculates divided illuminance data as image recognition support information for each of ambient light sensor (ALS) areas obtained by dividing the imaging surface into areas each having a predetermined size, and outputs the divided illuminance data corresponding to each of ALS areas to the image sensor 13 via an I2C I/F 13b. Note that the ALS areas and the divided illuminance data as the image recognition support information will be described later in detail.

The image processing unit 14 includes a DSP, for example, and applies demosaic processing to the image data (RAW data) supplied in a frame unit from the image sensor 13 and converts the image data into a YUV signal. Additionally, the image processing unit 14 applies face detection processing as image recognition processing to a Y component of the YUV signal in the frame unit. The face detection processing will be described later in detail. Furthermore, the image processing unit 14 encodes the YVU signal in accordance with a predetermined encoding system, and records the encoded data obtained as a result thereof in the flash memory 15.

The DRAM 16 is utilized as a storage region of the face detection processing performed by the image processing unit 14. In the ROM 17, a face pattern and the like to be referred to in the face detection processing by the image processing unit 14 is recorded in advance.

An image being monitored or being recorded, a reproduced image, various setting screens, and the like are displayed on the display 18. The touch panel 19 is arranged in a manner superimposed on the display 18, and accepts various kinds of input operation by a user.

Figure 2:
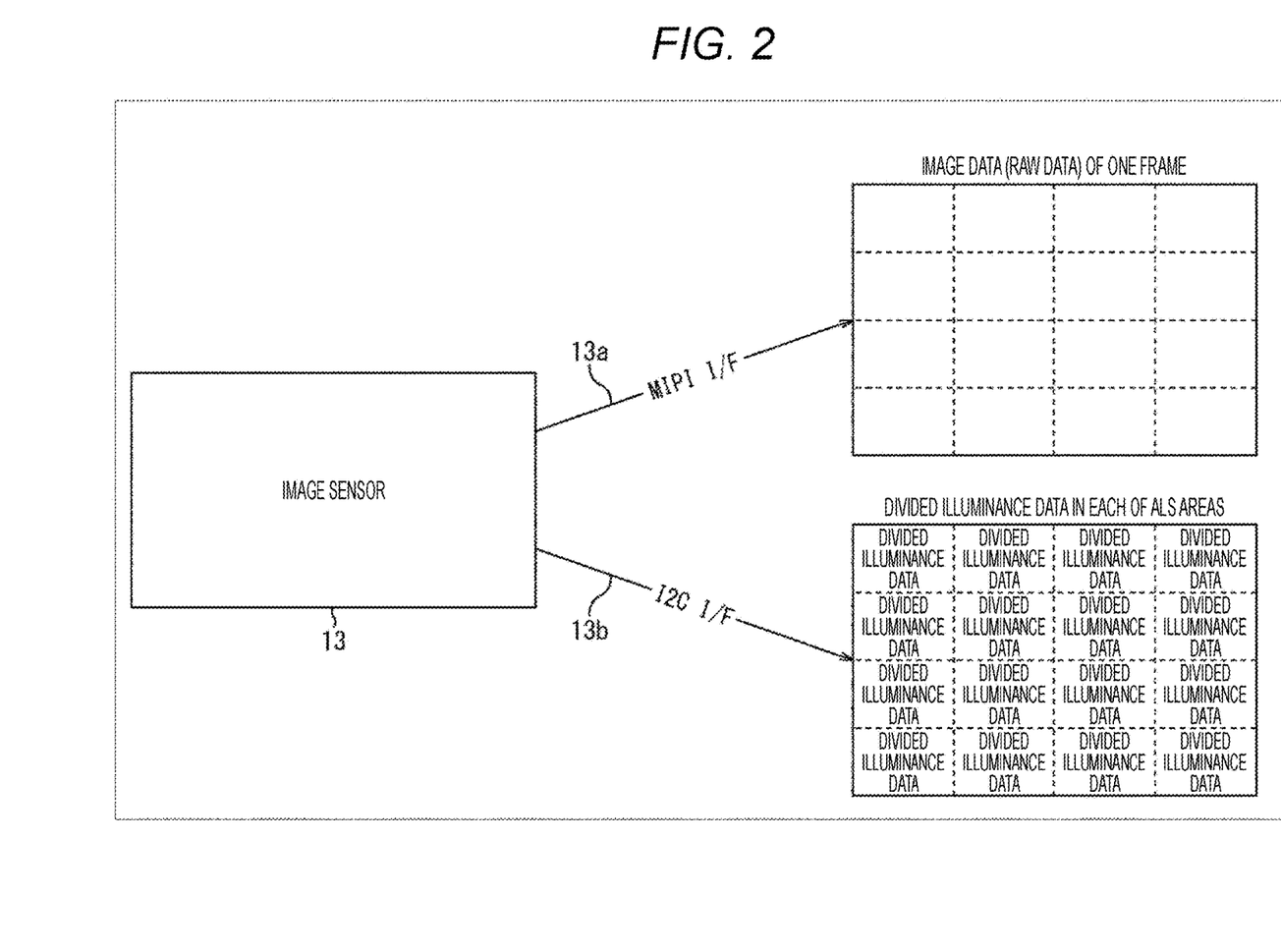
FIG. 2 is a diagram to describe output of an image sensor.

Next, output of the image sensor 13 will be specifically described. FIG. 2 is a diagram to describe output of an image sensor 13.

As described above, the image sensor 13 outputs, to the image processing unit 14 via the MIPI I/F 13a, the image data (RAW data) in a frame unit obtained as a result of the photoelectric conversion processing in accordance with the incident light.

Additionally, the image sensor 13 calculates divided illuminance data corresponding to each of the ALS areas, and outputs the same to the image processing unit 14 via the I2C I/F 13b. Meanwhile, in a case of this drawing, the imaging surface of the image sensor 13 is divided into 4×4 ALS areas. Therefore, the divided illuminance data for sixteen areas is output from the image sensor 13 to the image processing unit 14. Note that the number of divisions of the ALS areas is not limited to 4×4 and can be arbitrarily set.

As the divided illuminance data, an average value of pixel values of pixels belonging to each ALS area is calculated. For example, in a case where pixels are arranged in a Bayer array on the imaging surface, each pixel outputs a signal of any one of a color component of R, Gr, B, and Gb. In this case, an average value $R_{AV}$ of pixel values of pixels each outputting a R component signal, an average value $Gr_{AV}$ of pixel values of pixels each outputting a Gr component signal, an average value $B_{AV}$ of pixel values of pixels each outputting a B component signal, and an average value $Gb_{AV}$ of pixel values of pixels each outputting a Gb component signal are calculated as the divided illuminance data. Meanwhile, more accurate divided illuminance data may also be calculated by weighting respective values of R, Gr, B, and Gb.

Meanwhile, as for a calculation method of the divided illuminance data, pixel values may be used after decimating pixel values instead of using pixel values of all of the pixels belonging to each of the ALS areas. Additionally, the calculation method of the divided illuminance data is not limited to the example described above, and any method may be applicable as far as the divided illuminance data is calculated on the basis of the RAW data.

Furthermore, the image sensor 13 can set upper and lower threshold values of the divided illuminance data for each ALS area. Then, in a case where calculated divided illuminance data exceeds one of the upper and lower threshold values due to, for example, entrance of a new subject on an image, the divided illuminance data is flagged and output to the image processing unit 14.

Meanwhile, as the image recognition support information, the image sensor 13 may acquire a temperature, a distance, a phase difference, a hue, and the like in each ALS area instead of or in addition to the divided illuminance data, and supply the acquired data to the image processing unit 14.

<Description of Face Detection Processing as Image Recognition Processing>

Figure 3:
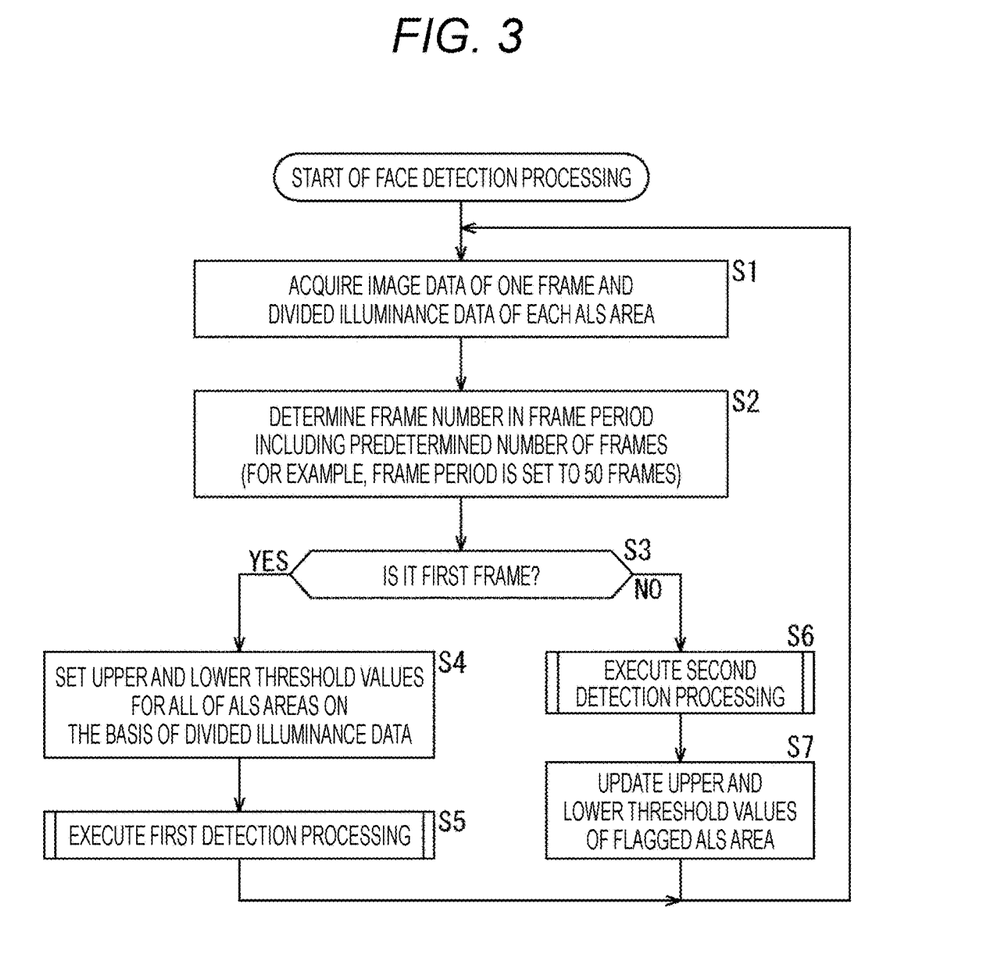
FIG. 3 is a flowchart to describe face detection processing.

FIG. 3 is a flowchart illustrating face detection processing performed by the imaging apparatus 10. The face detection processing is continuously executed every frame period during monitoring or recording.

In step S1, the image sensor 13 outputs image data of one frame to the image processing unit 14 via the MIPI I/F 13a. Additionally, the image sensor 13 calculates divided illuminance data of each ALS area and outputs the same to the image sensor 13 via the I2C I/F 13b. At this point, in a case where upper and lower threshold values of the divided illuminance data are already set, the image sensor 13 flags and outputs the divided illuminance data and outputs to the image processing unit 14 in a case where the divided illuminance data exceeds one of the upper and lower threshold values.

In step S2, the image processing unit 14 determines a frame number in a predetermined frame period of received image data and divided illuminance data of each ALS area corresponding thereto (in this case, the frame period is set to include 50 frames. But, the frame period can be arbitrarily changed). In step S3, the image processing unit 14 determines whether a determination result in step S2 is a first frame. In a case of determining that the result is the first frame, the processing proceeds to step S4.

In step S4, the image sensor 13 sets upper and lower threshold values for each of all of the ALS areas on the basis of the divided illuminance data calculated in step S1. Specifically, the upper threshold value is set by adding a preset predetermined offset value to the divided illuminance data, and also the lower threshold value is set by subtracting a preset predetermined offset value from the divided illuminance data. After that, the processing proceeds to step S5. In step S5, the image processing unit 14 executes first detection processing.

Figure 4:
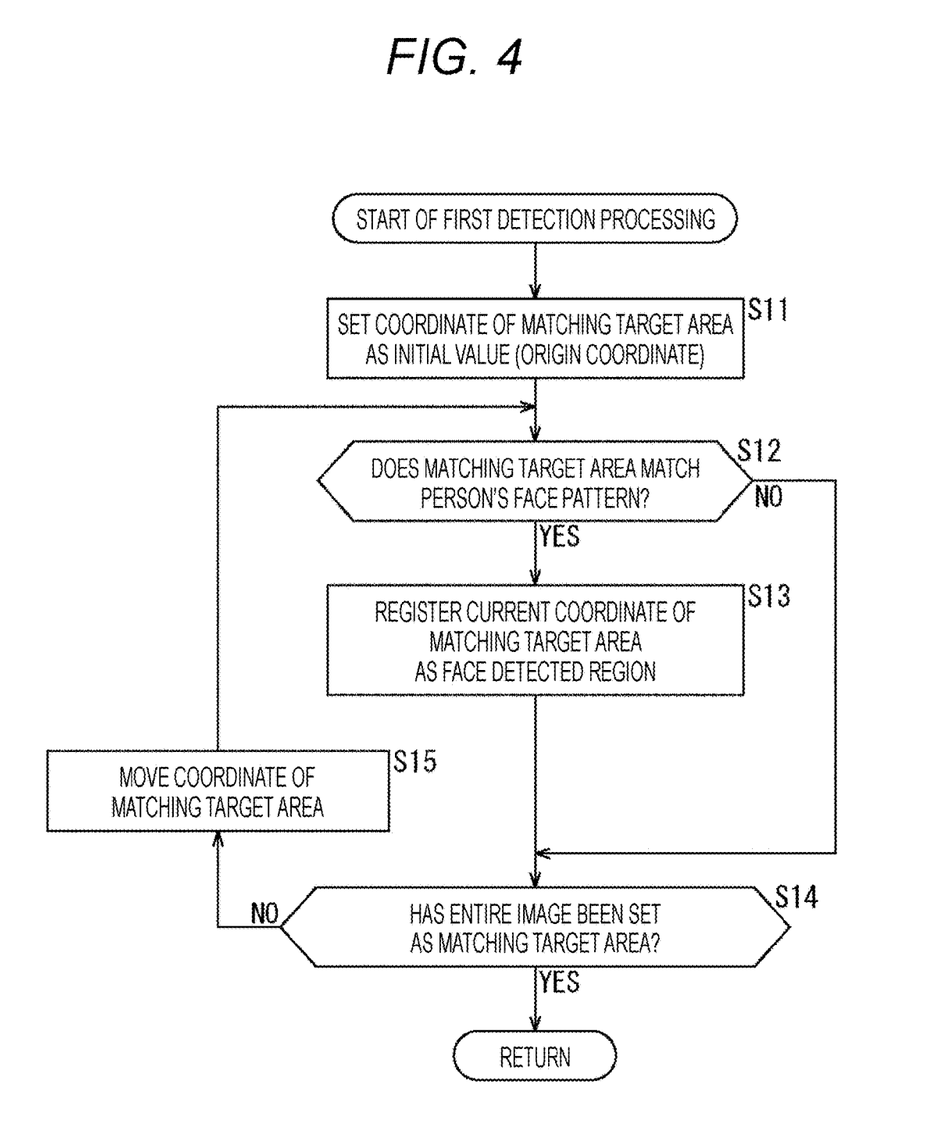
FIG. 4 is a flowchart to describe a first detection processing (subroutine).
Figure 5:
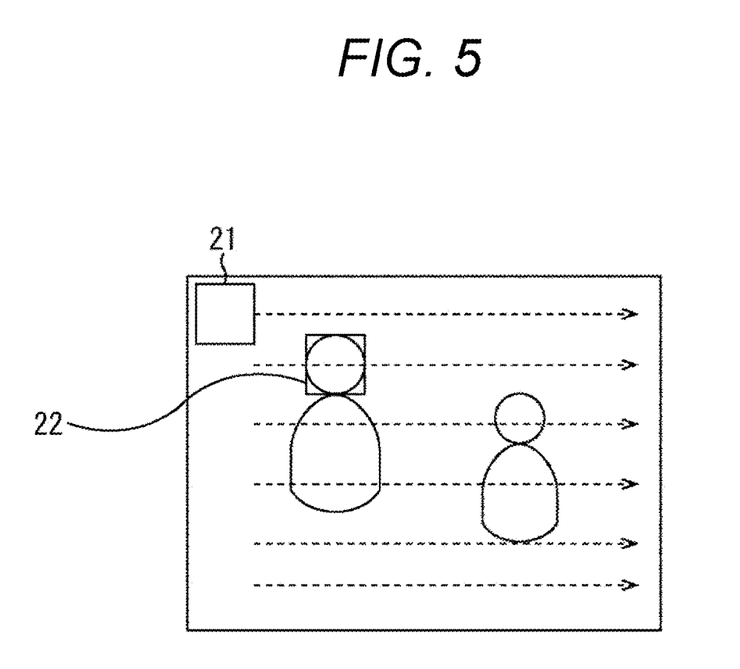
FIG. 5 is a diagram to specifically describe the face detection processing.

FIG. 4 is a flowchart to describe the first detection processing in step S5 in detail. FIG. 5 is an exemplary image to describe the first detection processing.

In step S11, the image processing unit 14 sets, as an initial value (origin coordinate. Upper left on a screen), a coordinate of a matching target area 21 having a predetermined size in which a person's face is moved on an image in a case of detecting a person's face. Subsequently, in step S12, the image processing unit 14 determines whether an image inside the matching target area 21 matches a person's face pattern prepared in advance. Here, in a case of determining that the image matches the face pattern, the processing proceeds to step S13. Conversely, in a case of determining that the image does not match the face pattern, step S13 is skipped.

In step S13, the image processing unit 14 registers a current coordinate of the matching target area 21 that has matched the face pattern as a face detected region 22.

Next, in step S14, the image processing unit 14 determines whether the entire image has been set as the matching target area 21. In a case of determining that the entire image is has not been set as the matching target area 21 (in other words, a region not set as the matching target area 21 remains), the processing proceeds to step S15.

In step S15, the image processing unit 14 moves coordinate of the matching target area 21 by a predetermined width in raster scan order. After that, the processing is returned to step S12, and the processing from steps S12 to S15 is repeated. Then, in step S14, in a case of determining that the entire image has been set as the matching target area 21 (in other words, a region not set as the matching target area 21 does not remain), the first detection processing is finished, and the processing is returned to step S1 in FIG. 3, and a next frame is subjected to the face detection processing.

The description is returned to FIG. 1. In step S3, in a case of determining that the result is not the first frame, the processing proceeds to step S6. In step S6, the image processing unit 14 executes second detection processing.

Figure 6:
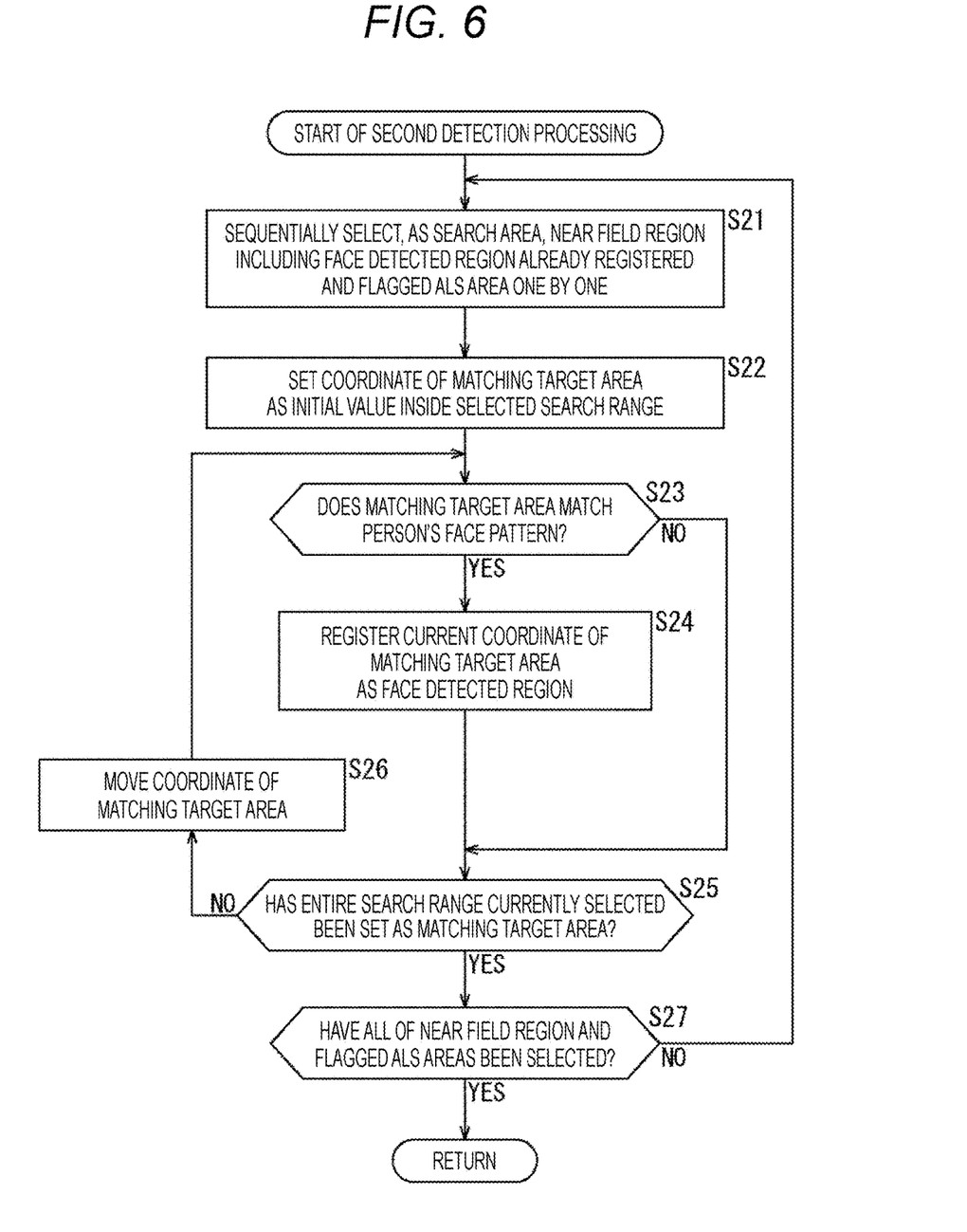
FIG. 6 is a flowchart to describe a second detection processing (subroutine).
Figure 7:
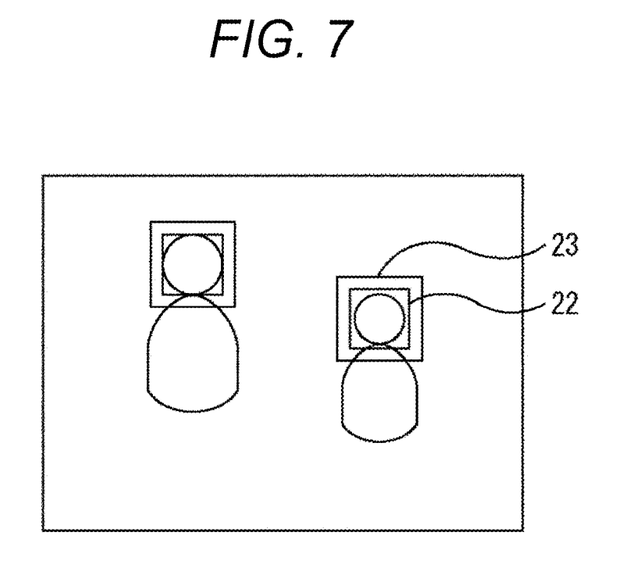
FIG. 7 is a diagram to specifically describe the face detection processing.
Figure 8:
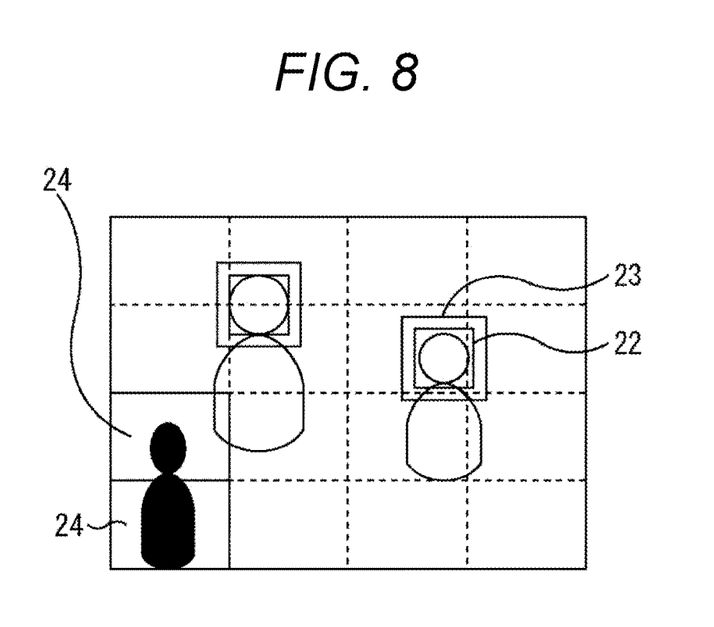
FIG. 8 is a diagram to specifically describe the face detection processing.

FIG. 6 is a flowchart to describe the second detection processing in step S6. FIG. 7 and FIG. 8 are exemplary images to describe the second detection processing.

In step S21, as illustrated in FIG. 7, the image processing unit 14 sets a near field region 23 larger than the face detected region 22 and including the face detected region 22 detected from the previous frame and already registered. Additionally, the image processing unit 14 sequentially selects, as a search range, the near field region 23 and a flagged ALS area (ALS area where there is some change on the screen and divided illuminance data exceeds any one of the upper and lower threshold values) 24 one by one.

In step S22, the image processing unit 14 sets a coordinate of a matching target area 21 as an initial value of a selected search region (origin coordinate. Upper left on the screen).

In step S23, the image processing unit 14 determines whether an image inside the matching target area 21 matches a person's face pattern prepared in advance. Here, in a case of determining that the image matches the face pattern, the processing proceeds to step S24. Conversely, in a case of determining that the image does not match the face pattern, step S24 is skipped.

In step S24, the image processing unit 14 registers, as a face detected region 22, a current coordinate of the matching target area 21 having matched the face pattern.

Next, in step S25, the image processing unit 14 determines whether the entire search range being selected has been set as the matching target area 21. In a case of determining that the entire search range currently selected has not been set as the matching target area 21 (in other words, a region not set as the matching target area 21 remains), the processing proceeds to step S26.

In step S26, the image processing unit 14 moves the coordinate of the matching target area 21 by a predetermined width inside the search range being selected. After that, the processing is returned to step S23, and the processing from steps S23 to S26 is repeated. Then, in step S25, in a case of determining that the entire search range has been set as the matching target area 21 (in other words, a region not set as the matching target area 21 does not remain), the processing proceeds to step S27.

In step S27, the image processing unit 14 determines whether all of the near field region 23 and flagged ALS area 24 have been selected as the search range. Then, in a case of determining that all of the near field region 23 and flagged ALS area 24 have not been selected as the search range (in other words, there is a portion not selected as the search range remains), the processing is returned to step S21, and the processing from steps S21 to S27 is repeated. After that, in a case of determining in step S27 that all of the near field region 23 and flagged ALS area 24 have been selected as the search range (in other words, a portion not selected as the search range does not remain), the second detection processing is finished, and the processing proceeds to step S7 in FIG. 3.

In step S7, the image sensor 13 sets the upper and lower threshold values of the flagged ALS area 24 on the basis of the divided illuminance data calculated latest in step S1. More specifically, the setting is performed in a manner similar to the above-described processing in step S4.

After that, the processing is returned to step S1 in FIG. 3, and a next frame is subjected to the face detection processing. The description of the face detection processing is finished here.

According to the above-described face detection processing, in a case where a person's face is detected by the first detection processing executed at a predetermined frame period while setting the entire screen as the matching target area 21, a near field region including a detected face is set as a search range by the second detection processing in next and subsequent frames thereto as illustrated in FIG. 7. Therefore, the face can be quickly detected in the next frame as well.

Additionally, since a region to be set as the matching target area 21 in the second detection processing is smaller than that in the first detection processing, a processing load on the image processing unit 14 can be reduced. Therefore, enlargement of a circuit size and high-speed operation of the image processing unit 14 can be suppressed, and increase of power consumption can be suppressed.

Furthermore, for example, in a case where a subject not detected in a previous frame appears on the screen as illustrate in FIG. 8, such an ALS area is also set as a search range, and therefore, a face of a person newly appeared can also be detected.

<First Modified Example of Face Detection Processing>

In the above-described face detection processing, the first detection processing is executed at a predetermined frame period (in the above description, once every 50 frames), but the first detection processing may also be executed only for a first frame, and the second detection processing may be executed for frames after the first. With this configuration, the processing load on the image processing unit 14 can be more reduced while keeping face detection accuracy from the entire screen.

<Second Modified Example of Face Detection Processing>

Prior to determination on matching between the matching target area 21 and a face pattern in step S13 of the first detection processing and the step S23 of the second detection processing described above, gain may be increased only in a region inside an image having low illuminance so as to perform noise reduction. Specifically, a predetermined gain value 4 may be multiplied by a pixel value only for an ALS area where divided illuminance data is a predetermined reference value or less, and noise may be removed by a low-pass filter or the like. This also can improve the face detection accuracy.

Meanwhile, in the present embodiment, the face detection processing as the image recognition processing has been described, but the image recognition processing is applicable to a case of recognizing a part other than a face of a subject, such as a hand, for example.

The embodiment of the present disclosure is not limited to the above-described embodiment, and various kinds of modifications can be made within a range not departing from the gist of the present disclosure.

Additionally, the present disclosure can also have the following configurations.

(1)

An imaging apparatus including:

an image sensor adapted to output image data including pixel signals generated in accordance with incident light by photoelectric conversion elements vertically and horizontally arranged on an imaging surface, adapted to divide the imaging surface into a plurality of areas, and adapted to generate image recognition support information for each of the areas on the basis of the pixel signals generated by the photoelectric conversion elements belonging to the area; and an image processing unit adapted to apply predetermined image processing to the image data output from image sensor by using the image processing support information output from the image sensor.

(2)

The imaging apparatus recited in (1) above, in which the image sensor sets a threshold value for the image processing support information for each of the areas, and in a case where the calculated image processing support information exceeds the threshold value, the image sensor flags and outputs the calculated image processing support information.

(3)

The imaging apparatus recited in (1) or (2) above, in which the image sensor performs, for each of the areas, statistical operation on the pixel signals generated by the photoelectric conversion elements belonging to the area, and calculates the image processing support information.

(4)

The imaging apparatus recited in any one of (1) to (3) above, in which the image sensor calculates, for each of the areas, divided illuminance data as the image processing support information by averaging the pixel signals generated by the photoelectric conversion elements belonging to the area.

(5)

The imaging apparatus recited in any one of (1) to (4) above, in which the image sensor outputs at least one of a temperature, a distance, a phase difference, and a hue in each of the areas as the image processing support information.

(6)

The imaging apparatus recited in any one of (1) to (5) above, in which the image sensor sets the threshold value on the basis of the image processing support information calculated for each of the areas.

(7)

The imaging apparatus recited in any one of (2) to (6) above, in which the image processing unit limits a target region of the predetermined image processing in accordance with presence of a flag in the image processing support information of each of the areas.

(8)

The imaging apparatus recited in any one of (2) to (7) above, in which the image processing unit sets, as a target of the predetermined image processing, the area corresponding to the flagged image processing support information out of the image data output from the image sensor.

(9)

The imaging apparatus recited in any one of (1) to (8) above, in which the image processing unit performs image recognition processing as the predetermined image processing and sets, as a search region of the image recognition processing, a near field region including a region having a recognition object detected by the image recognition processing applied to the image data of a previous frame, out of the image data output from image sensor.

(10)

The imaging apparatus recited in any one of (1) to (9) above, in which the image sensor outputs the image data and the image processing support information of each of the areas respectively from different I/Fs.

(11)

An image sensor adapted to output image data including pixel signals generated in accordance with incident light by photoelectric conversion elements vertically and horizontally arranged on an imaging surface, adapted to divide the imaging surface into a plurality of areas, and adapted to generate image recognition support information for each of the areas on the basis of the pixel signals generated by the photoelectric conversion elements belonging to the area.

(12)

An image processor adapted to apply predetermined image processing to image data output from an image sensor by using image processing support information output from the image sensor, the image sensor being adapted to: output the image data including pixel signals generated in accordance with incident light by photoelectric conversion elements vertically and horizontally arranged on an imaging surface; divide the imaging surface into a plurality of areas; and generate image recognition support information for each of the areas on the basis of the pixel signals generated by the photoelectric conversion elements belonging to the area.

REFERENCE SIGNS LIST

10 Imaging apparatus
11 Control unit
12 Lens
13 Image sensor
13a MIPI I/F
13b I2C I/F
14 Image processing unit
15 Flash memory
16 DRAM
17 ROM
18 Display
19 Touch panel

The invention claimed is:

1. An imaging apparatus comprising:
an image sensor configured to output image data including pixel signals generated in accordance with incident light by photoelectric conversion elements vertically and horizontally arranged on an imaging surface, configured to divide the imaging surface into a plurality of areas, and configured to generate image recognition support information for each of the areas on the basis of the pixel signals generated by the photoelectric conversion elements belonging to the area; and
an image processing unit adapted to apply predetermined image processing to the image data output from image sensor by using the image processing support information output from the image sensor, wherein the image sensor sets a threshold value for the image processing support information for each of the areas, and in a case where a calculated image processing support information exceeds the threshold value, the image sensor flags and outputs the calculated image processing support information.

2. The imaging apparatus according to claim 1, wherein the image sensor performs, for each of the areas, statistical operation on the pixel signals generated by the photoelectric conversion elements belonging to the area, and calculates the image processing support information.

3. The imaging apparatus according to claim 1, wherein the image sensor calculates, for each of the areas, divided illuminance data as the image processing support information by weighting and averaging the pixel signals generated by the photoelectric conversion elements belonging to the area.

4. The imaging apparatus according to claim 1, wherein the image sensor outputs at least one of a temperature, a distance, a phase difference, and a hue in each of the areas as the image processing support information.

5. The imaging apparatus according to claim 1, wherein the image sensor sets the threshold value on the basis of the image processing support information calculated for each of the areas.

6. The imaging apparatus according to claim 1, wherein the image processing unit limits a target region of the predetermined image processing in accordance with presence of a flag in the image processing support information of each of the areas.

7. The imaging apparatus according to claim 6, wherein the image processing unit sets, as a target of the predetermined image processing, the area corresponding to the flagged image processing support information out of the image data output from the image sensor.

8. The imaging apparatus according to claim 6, wherein the image processing unit performs image recognition processing as the predetermined image processing and sets, as a search region of the image recognition processing, a near field region including a region having a recognition object detected by the image recognition processing applied to the image data of a previous frame, out of the image data output from image sensor.

9. The imaging apparatus according to claim 1, wherein the image sensor outputs the image data and the image processing support information of each of the areas respectively from different I/Fs.

10. An image sensor comprising:
circuitry configured to output image data including pixel signals generated in accordance with incident light by photoelectric conversion elements vertically and horizontally arranged on an imaging surface, configured to divide the imaging surface into a plurality of areas, and configured to generate image recognition support information for each of the areas on the basis of the pixel signals generated by the photoelectric conversion elements belonging to the area, wherein the image sensor sets a threshold value for the image processing support information for each of the areas, and in a case where a calculated image processing support information exceeds the threshold value, the image sensor flags and outputs the calculated image processing support information.

11. An image processor comprising:
circuitry configured to apply predetermined image processing to image data output from an image sensor by using image processing support information output from the image sensor, the image sensor being adapted to output the image data including pixel signals generated in accordance with incident light by photoelectric conversion elements vertically and horizontally arranged on an imaging surface, being adapted to divide the imaging surface into a plurality of areas, and being adapted to generate image recognition support information for each of the areas on the basis of the pixel signals generated by the photoelectric conversion elements belonging to the area, wherein the image sensor sets a threshold value for the image processing support information for each of the areas, and in a case where a calculated image processing support information exceeds the threshold value, the image sensor flags and outputs the calculated image processing support information.

* * * * *